Sept. 14, 1937.   F. L. O. WADSWORTH   2,092,865
SHEAR MECHANISM
Original Filed Feb. 18, 1933   2 Sheets-Sheet 1
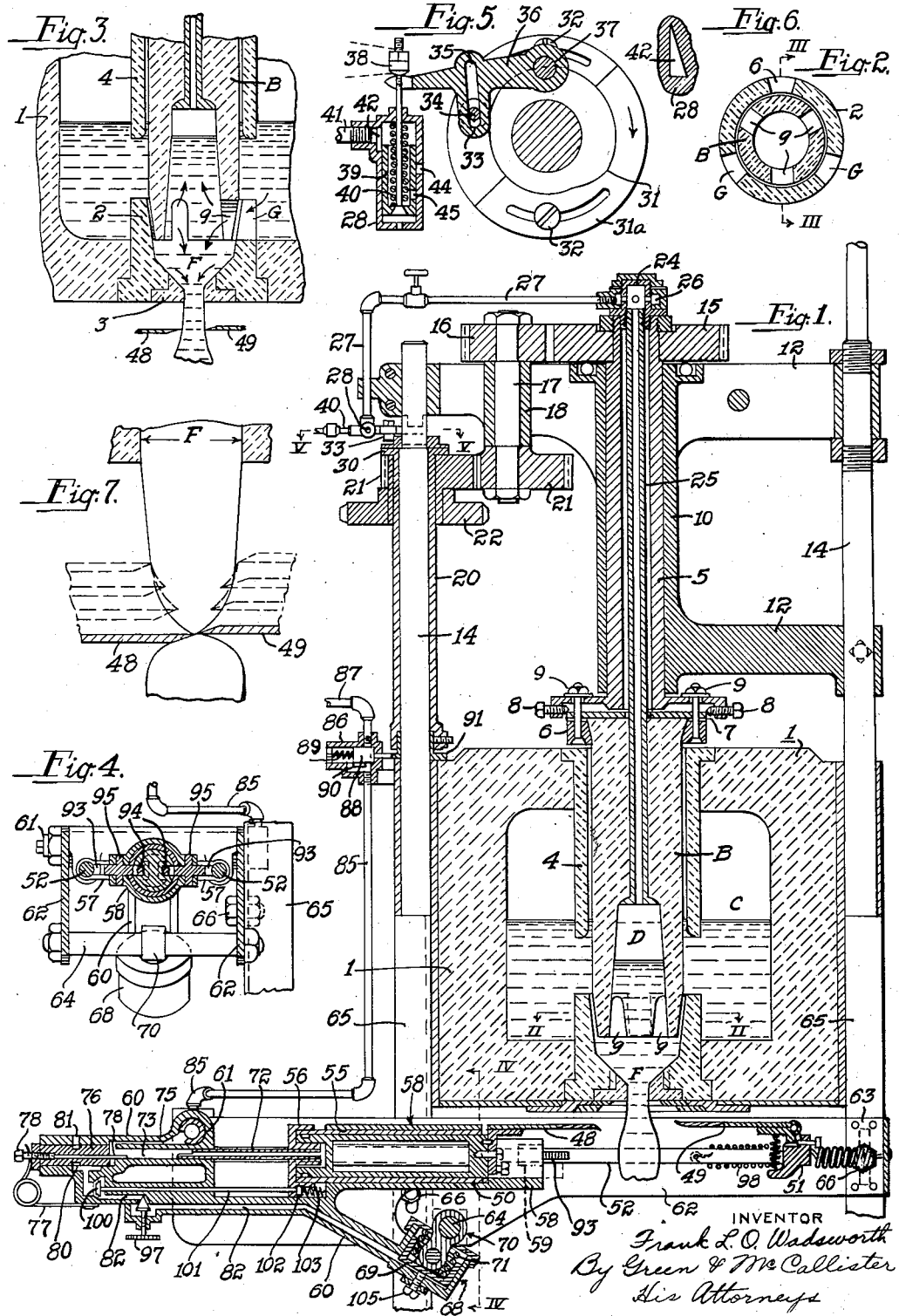

Sept. 14, 1937. F. L. O. WADSWORTH 2,092,865
SHEAR MECHANISM
Original Filed Feb. 18, 1933 2 Sheets-Sheet 2
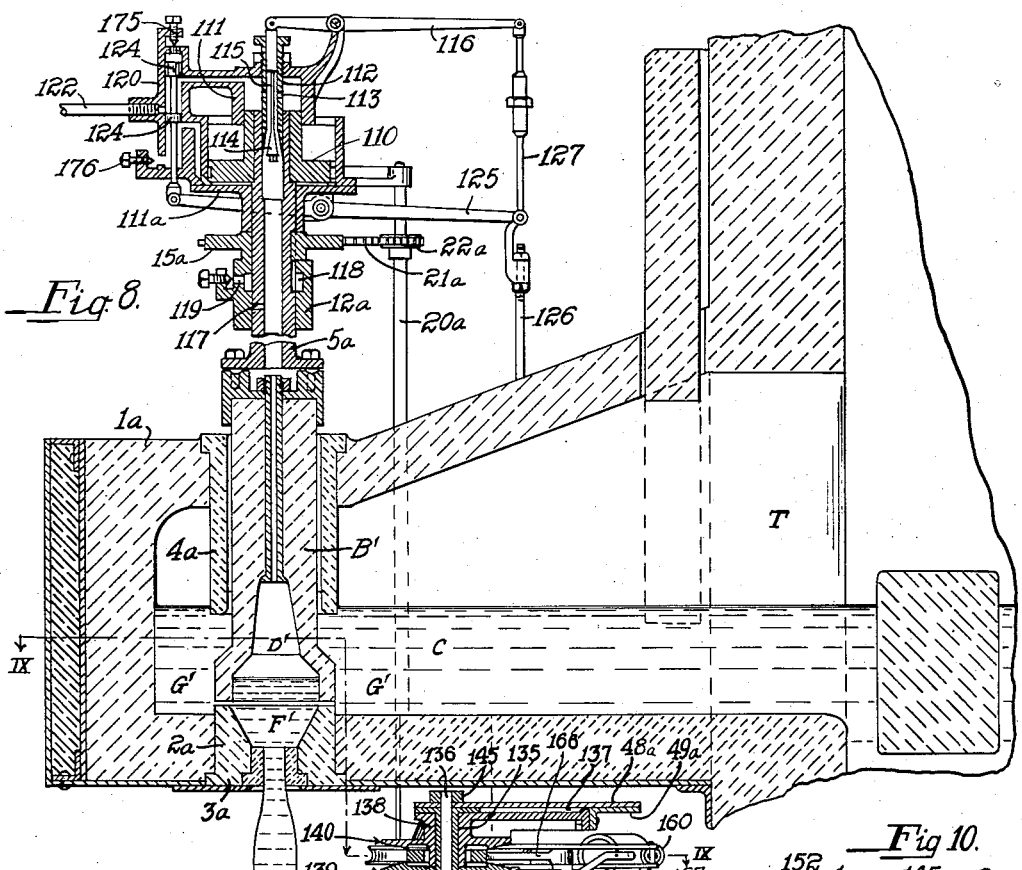
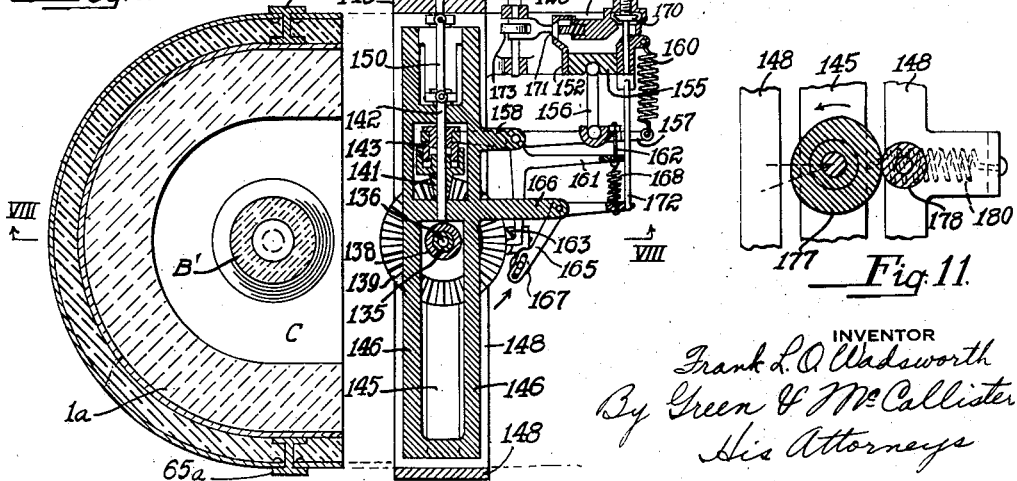
INVENTOR
Frank L. O. Wadsworth
By Green & McCallister
His Attorneys Patented Sept. 14, 1937

2,092,865

UNITED STATES PATENT OFFICE 2,092,865

SHEAR MECHANISM

Frank L. O. Wadsworth, Pittsburgh, Pa., assignor to Ball Brothers Company, Muncie, Ind., a corporation of Indiana Original application February 18, 1933, Serial No. 657,323. Divided and this application December 14, 1933, Serial No. 702,346. Renewed March 2, 1936

26 Claims. (Cl. 49—14)

This invention relates to automatic glass feeders of the uninterrupted discharge type in which the molten glass is permitted to flow continuously from a submerged delivery orifice under the influence of gravity supplemented periodically by subjecting it to the effect of a controllable fluid pressure to give a stream of alternate increased and decreased diameters, and more particularly, to improvements in the art of severing said stream of glass at the points of reduced cross section into separate gobs or mold charges, and is a division of my copending application Serial No. 657,323, filed February 18, 1933.

The primary object of this invention is to provide a shearing mechanism for severing a constantly flowing stream of molten glass, which is capable of performing the severing operation without interfering with the continuity of flow of the molten material, that is to say, without checking or momentarily arresting those portions of the glass with which the shear blades come in contact and thereby prevent the physical characteristics of the material from being altered due to chilling and stiffening of the glass at the place of severance.

Another object of this invention is to provide a high speed shearing mechanism for severing a continuously flowing stream of molten glass into mold charges which will travel with the stream during the cutting-off period, eliminate "piling" on the shear blades, reduce the tendency of the blades to heat and make it possible to increase the speed of operation of the feeder materially, since with my rapid speed of shears, the cut-off can be performed without arresting or retarding the movement of the flow and consequently, I avoid any chilling or attendant stiffening of the viscous material commonly encountered when the flow is arrested or retarded.

Still another object of the present invention is to provide an improved form of shear mechanism which will sever the continuously flowing stream of glass by a combined transverse and axial movement thereof or therethrough and thereby decrease the time and the area of contact between the shear blades and the molten material.

Other purposes and advantages of my improved mode of shearing and the apparatus which I have devised for its practice will be made apparent to those skilled in this particular art by two illustrative embodiments of these improvements.

In the drawings, which form a part of this description, Fig. 1 is a transverse vertical section through the center of the delivery orifice of the feeder; Fig. 2 is a horizontal section on the plane II—II of Fig. 1; Fig. 3 is another (partial) vertical section on the plane III—III of Fig. 2 (at right angles to the sectional plane of Fig. 1); Fig. 4 is a section on the plane IV—IV of Fig. 1 and illustrates a detail of the shear mechanism; Fig. 5 is a horizontal section on the plane V—V of the same figure; Fig. 6 is an enlarged fragmental longitudinal section through one of the valve ports shown in Fig. 5; and Fig. 7 is a greatly enlarged view illustrating the action of the transversely and axially moving shear blades in severing the flowing stream of glass.

Fig. 8 is a vertical longitudinal section through the delivery orifice of a second form of feeder embodying my invention; Fig. 9 is a horizontal section on the double plane IX—IX—IX of Fig. 8; Fig. 10 is a reduced scale side view of the main frame support for the shear mechanism shown in the lower part of Fig. 8; and Fig. 11 is a greatly enlarged section on the plane XI—XI of Fig. 8.

The construction illustrated in Figs. 1 to 7 inclusive comprises a forehearth 1, which extends out from the front of a glass melting tank (not here shown), and which is provided, near its front end, with a submerged delivery orifice F, and a cylindrical bell shaped control member B, that is positioned above the orifice and extends up through the roof of the forehearth 1. The lower end of the member B is preferably tapered, and is surrounded by an internally coned flow block 2, which is removably mounted in the floor of the forehearth, and which is provided with the usual ring bushing 3, that may be easily removed and replaced, independently of the block 2, when it is desired to change the size of the delivery orifice F. The upper portion of the bell B is preferably surrounded by a cylindrical sleeve 4 whose lower end is immersed in the parent body of glass in the forehearth chamber (C), and whose upper end is tightly seated in the roof blocks of the said chamber, and which therefore constitutes a sealing member which prevents any escape of heated gas through the roof opening that surrounds the bell.

The upper end of the control bell B is enlarged to form an outwardly coned head, which is adjustably secured to the adjacent flanged terminal of a tubular shaft 5, by the annular collar and cap elements 6—7; the centering and leveling screws 8—8 etc., and the clamp bolts 9—9 etc.; and this shaft member 5 is rotatably mounted in the central bearing sleeve 10 of a vertically adjustable frame 12, which is carried by two uprights 14—14 that are rigidly attached to the supporting framework of the forehearth 1. A large spur gear 15 is keyed and clamped to the upper end of the shaft 5, and is engaged by a smaller pinion 16, which is secured to a short shaft 17 that is revolvably supported in an offset bearing 18 on the frame 12. The shaft 17 is operatively connected to a second tubular shaft 20, (which is rotatably mounted on one of the uprights 14) by means of two elliptic gears 21—21; and the shaft 20 is provided with a gear or sprocket wheel 22, which can be driven from any suitable source of power (not here shown), such as a variable speed electric motor.

The lower open end of the bell B, and the adjacent upper end of the flow block 2, together form a segregation chamber D, which is adapted to contain, and at times confine, a relatively small mass of molten glass above the delivery outlet F. The two cooperating and overlapping ends of the members, 2 and B, are each provided with a series of equally spaced rectangular notches, G—G—G and g—g—g, whose combined area is several times that of the delivery orifice F, and which are successively moved into, and out of, registry with each other (as shown respectively in Fig. 3 and Figs. 1-2) as the bell B is revolved by the train of gearing above described.

The upper portion of the segregation chamber D is connected to a perforated cap 24, which is mounted at the upper end of the shaft 5, by means of the pipe 25 that passes up through the tubular shaft and is screwed into the base of the cap 24; and this perforated cap is surrounded by an annular coupling ring 26, which is connected, by the pipe 27, with a valve cylinder 28, carried by the frame 12. The upper end of the tubular shaft 20 is provided with a flange 30, which is adapted to carry a detachable, and angularly adjustable, cam disc 31, which may be formed in two parts (for convenient removal from its supporting member 30), and which (as shown in Fig. 5) may be secured to its support by the screws 32—32, which pass through elongated annular slots in the depressed rim 31ª of the cam disc. The edge of this cam is engaged by a cam roller 33 which is rotatably mounted on a stud pin 34 that can be clamped in any desired position in the slot 35 of the arm 36. This arm is pivotally mounted on a stud bolt bearing 37, which is carried by the adjacent extremity of the frame 12; and its outer forked end is engaged with an adjustable collar 38 on the stem of a piston valve 39 which is reciprocably mounted in the cylinder 28, and is normally held in its open position (see Fig. 5) by the spring 40. The cylinder 28 is connected with a suitable source of positive fluid pressure by a pipe 41, that communicates with the interior of the cylinder through an elongated and tapered port opening 42 (see Figs. 5 and 6). The cylinder 28 and the piston valve 39 are provided respectively with an exhaust port 44 and a vent port 45, which are brought into registry when the piston valve is moved to its closed position; and one side of this reciprocating valve 39 is cut away (not shown) to always afford an open communication between its interior and the pipe connection 27, and thus open the latter to the atmosphere when the valve 39 is moved to its closed position bringing the ports 44—45 into registry.

The operation of those parts of the feeder organization which have been described above is as follows: The rotation of the shaft 20 will revolve the shaft 5, and the attached bell B, at a periodically increased and decreased speed which will alternately move the bell ports g, g, g, into and out of registry with the flow block ports G, G, G;—the elliptic gears 21—21 being preferably so set that this movement is slowest when the said parts are opposite each other (as shown in Fig. 3), and is most rapid when they are in the intermediate position shown in Figs. 1 and 2. The valve cam 31 is so set that when the admission passageways G—g, G—g, G—g are fully open the valve 39 will be closed, thus cutting off communication between the fluid pressure supply pipe 41 and the upper end of the segregation chamber D and opening the latter to the outside air. The molten glass will then flow into the interior of the bell much more rapidly than it can be discharged from the flow opening F, under the influence of gravity alone; and this rapid inflow will very quickly raise the level of the glass in the chamber D to that—or nearly to that—of the parent body of material in the forehearth chamber C. When the continued rotation of the bell has moved the ports g—g—g out of registry with the openings G—G—G, the cam 31 will act to move the piston valve 39 toward its open position—or rather to permit such movement to occur under the action of the spring 40—thus closing the exhaust port 44 and opening the port 42 (either rapidly or slowly as may be desired), and the reapplication of super-atmospheric pressure to the now confined mass of glass above the delivery opening F will supplement, or complement, the action of gravity in discharging the molten material therefrom. It is obvious that this acceleration of flow—and the resultant change in the form and contour of successively discharged portions of the flowing stream—may be regulated and controlled, within wide limits, by using cams (31) and port openings (42) of different shapes; and that other variations, within narrower limits, may be made by an angular adjustment of the cam 31 on its supporting flange 30, or by moving the cam roller bearing 34 in the slot 35, or by changing the setting of the valve stem collar 38, or by altering the pressure in the supply line 40.

In order to separate or cut the successively enlarged portions of the flowing stream into a series of mold charges of predetermined form and weight, I provide a shear mechanism, which can be adjusted to act in any desired time relationship to the movements of the feeder mechanism; and which is capable of performing its intended functions without interfering with the continuity of flow of the molten material—i. e. without checking or momentarily arresting those portions of the glass with which the shear blades come in contact—and without altering the physical characteristics of that material (e. g. by chilling and stiffening the glass at the plane of severance).

One form of shear mechanism which I have designed for the accomplishment of the above enumerated objects is shown in the lower portion of Fig. 1, and is further illustrated—as to certain features of construction and operation—in Figs. 4 and 7. This mechanism comprises a pair of shear blades 48—49, which are preferably of the usual "cat's eye" form, and which are respectively attached, one to the head of an elongated hollow piston member 50, and the other to a cross bar 51 that is secured to a pair of reciprocable rods 52—52. The piston member 50 is slidably mounted in an open ended cylinder 55, whose rear head 56 is provided with radially extended arms 57, 57 (see Fig. 4) that are clamped to the rods 52—52; and the two mutually reciprocable piston and cylinder elements (50 and 55) are cooperatively supported and guided by a cylindrical sleeve member 58 that forms one of the side arms of the Y shaped frame 60. The member 58 is also provided with side lugs 59 (one of which is indicated in dotted lines in Fig. 1) which form guides for the rods 52—52, and the latter are extended beyond the arms 57—57 to slidably engage with suitable bearings in the left hand end of the frame 60. This frame (60) is pivotally supported on a hollow trunnion bolt 61, whose ends are tightly clamped in, and to, an opposed pair of side plates, 62—62, that are also rigidly cross connected, at two other points, by a U shaped end member 63 and a spacer tie bolt 64; and one of these side plates is adjustably secured to the vertical buckstay supports 65—65 of the forehearth boot 1, by means of the bolts 66—66. The pivotally supported frame 60 is provided with a piston cylinder 68, which embraces a piston plunger 69, that is connected to the tie bolt 64 by the link 70; and the frame 60 is normally held in its elevated position (as shown in Fig. 1) by a compression spring 71, which is interposed between the recessed end of the plunger 69 and the end cap of the piston cylinder 68.

The head 56 of the cylinder 55 is provided with a tubular valve rod 72, whose outer end is slidably engaged with the valve chamber 73 that is connected to the interior of the hollow trunnion 61 by a passageway 75. The chamber 73 is in end communication with a somewhat larger and slightly offset chamber which contains a reciprocable piston valve 76, that is normally held in its advanced, or closed, position by a spring 77. This valve element 76 is provided with an adjustable stem 78, which is threaded through the body of the valve and which projects into the path of movement of the hollow valve rod 72. The valve body is further provided with a peripheral groove 80 which, in the advanced (closed) position of this element, affords an open communication between an atmospheric exhaust port 81 and a passageway 82 that leads to the closed end of the piston cylinder 68.

The bore of the hollow trunnion bolt 61 is connected, at one end, with a pipe 85 which leads to a timer valve cylinder 86 that is in turn connected to a pressure supply pipe 87. The piston element 88 of this timer valve is normally held in closed position by the spring 89, and is moved to its open position by a cam 91, which is adjustably secured to the lower end of the tubular drive shaft 20, and which can be so shaped and so set as to actuate the valve in any desired time relationship to the rotary movements of the bell member B.

When it is desired to sever the flowing stream of glass—which is preferably done during a period of natural gravity flow (when the diameter of the stream is a minimum), but which can be done at any time in the cyclic formation of the successively enlarged sections of the stream—the piston valve 88 is moved to the left to cut off the exhaust port 90 and open communication between the pressure supply pipe 87 and the pipe 85. This admits compressed air to the rear end of the cylinder 55 and acts to move that cylinder and its associated piston member 50 in opposite directions. These reverse movements will be communicated to the shear blades 48 and 49 (which are attached respectively to the head of the piston 50, and to the opposite head 56 of the cylinder 55 by the connecting rods 52—52 and the cross bar 51), and will move these blades toward each other to sever the stream. In order to ensure symmetry of action the rods 52—52 and the adjacent sides of the piston member 50 are provided with rack bars 93—93 and 94—94 which are engaged by idle spur pinions 95—95, that are rotatably mounted in side lugs on the sleeve member 58 (see Fig. 4). As the cylinder elements 55—56 move to the left, the lower edge of the tubular valve rod 72 will be brought against the end of the piston valve stem 78 and will move the valve element 76 to the left, to first close the exhaust port 81, and then establish communication between the port 75 and the passageway 82. This will admit compressed air to the piston cylinder 68 and will rock the frame 60, on its trunnion support 61; and will thereby impart to the advancing shear blades a downward movement, along the axis of the flowing stream. The initiation of this axial movement—with respect to the transverse movement of the shear blades—may be controlled by the adjustment of the valve stem 78; and this adjustment will be preferably so made that the frame 60 will begin to move down at the time when the edges of the blades 48—49 first engage the sides of the stream. The ratio between the speed of downward (axial) movement and of transverse (crosswise) movement of the cutting elements, can be controlled by a proper proportioning of the diameter of the piston 69, and of the return spring 71, and also by the adjustment of the throttle valve 97 in the passage 82; and the parts are preferably so constructed and adjusted that the first mentioned component of movement is always a little greater than the speed of flow of the glass in that portion of the stream which is being intercepted by the shear blades. Under such circumstances the relative movements of the shear blades and of those portions of the oncoming glass that are above the plane of severance are as indicated in Fig. 7; and no part of this downwardly flowing material can, at any time, "pile up" on the surface of the cutting elements, or be, in the slightest degree, checked or retarded in its normal movement.

The combined axial and transverse movement of the shear blades 48—49 is preferably continued for a short time after complete severance of the stream has been effected, for the joint purpose of moving the blades away from the tip of the severed stub of glass, and of concurrently imparting to the cut off charge an accelerated motion that will expedite its delivery to the receiving receptacle. The timer valve 88 is then actuated to cut off communication between the pressure supply (compressed air) pipe 87 and the pipe 85, and the latter is opened to the atmosphere (through the exhaust port 90); thus permitting the shear blades—and their actuating parts—to be returned to their initial inactive position by a pair of tension springs 98 which are attached, at one end, to the rods 52—52, and, at the other, to the plate 63. These springs—like the spring 71—also tend to lift the depressed frame 60 to its upper level; but this lifting action is delayed until the shear blades have been fully retracted in the following manner: The passageway 82 is provided with a one way check valve 100, which is connected, by a stem 101, with a head 102 that is adapted to be engaged by the cylinder member 56, when the shear blades are fully opened. When this member is moved to the left—as above described—the parts 56—102 are disengaged and the check valve 100 is then closed by the action of a spring 103. But as soon as the piston valve 76 is moved to admit compressed air to the outer end of the passageway 82, the check valve 100 is automatically opened, and remains open until the timer valve 88 acts to connect the pipe 85 with the exhaust port 90, and thereby permit of the retraction of the shear blades. The immediate drop in pressure in the port connection 75 then permits the check valve 100 to be closed by the spring 103; and it will remain closed—thus trapping the air in the cylinder 68 and preventing the lifting of the downwardly tilted frame 60—until the valve stem head 102 has been reengaged by the cylinder head 56. When this occurs the check valve 100 is forcibly opened against the pressure of the trapped air in the cylinder 68; and this air is permitted to escape through the groove 80 and the exhaust port 81 of the piston valve 76. The frame 60 will then—and not until then—be lifted, by the action of the springs 71 and 98—98, to the full line position of Fig. 1.

It is obvious that the initial "shear height"—i. e. the initial plane of engagement of the shear blades with the flowing stream of glass—and the initial inclination of this plane of engagement; may, one or both, be varied and controlled by moving one or both ends of the box frame 62—62—63 etc. up or down on the vertical posts 65—65; and that a similar adjustment may be independently effected by means of the stop screw 105 that is threaded through the lower end of the cylinder 68 and is engaged by the piston 69 on the upward return movement of the frame 60.

A second illustrative embodiment of my present improvements is shown in Figs. 8 to 11 inclusive. This construction comprises a forehearth 1ª which is connected, at its rear end, with a suitable glass melting tank T, and which is provided, near its front end, with a cylindrical internally coned floor block 2ª, and a cooperating ring bushing 3ª, that serve to define the form and size of the submerged delivery orifice F'. The movable bell B', which contains the segregation chamber D', is mounted above the delivery orifice F'', and extends up through a guard sleeve 4ª (whose form and function is the same as that of the sleeve 4; Figs. 1 and 3); and the upper end of this bell is adjustably attached to the adjacent flanged extremity of a hollow shaft member 5ª which is reciprocably and rotatably supported in a cross head 12ª that is rigidly clamped to the two side posts 65ª—65ª of the forehearth frame. The upper end of the shaft 5ª is secured to a two part piston 110, which is mounted in the cylinder 111—111ª; and this portion of the tubular member is also engaged with a hollow plunger valve element 112, that is adjustably supported in the upper head of the cylinder 111. The hollow plunger 112, is provided, at an intermediate point in its length, with lateral port openings 113, which open into the upper cylinder chamber; and is also provided, at its lower end, with a needle valve element 114, which is attached to a stem 115, that extends up through a packing box in the projecting portion of the plunger 112, and is pivotally connected to an actuating lever 116. The tubular shaft 5ª is also provided with a radial port 117; and the cross head bearing member 12ª, has an annular groove, 118, which communicates with the external atmosphere through a manually controlled throttle valve opening 119, and which is so positioned as to register with the port 117 during a part of the reciprocatory movement of the shaft 5ª.

The cylinder 111 carries a slide valve box 120, which is connected to a suitable source of fluid pressure (e. g. compressed air) by the pipe 122; and which contains a double piston valve 124, that serves to control the admission and exhaust of the actuating fluid to and from the upper and lower chambers of the cylinder.

The stem of this valve is connected to an actuating lever 125, which is pivotally mounted on the cylinder head 111ª; and the levers 125 and 116 are both operatively connected, by the adjustable link rods 126 and 127, with cams 128 and 129 on a timer shaft 130, which is in turn connected to, and driven by, the shaft 131 of a suitable variable speed motor, through a train of reduction gears (as shown in Fig. 9) or in any other suitable manner.

The bell actuating shaft 5ª is also preferably provided with a large sprocket wheel 15ª, which is slidably connected thereto by spline and key elements, and which is rotatably mounted, and held against axial movement, between the upper face of the cross head bearing 12ª and the adjacent end of the lower detachable head (111ª) of the cylinder 111. This sprocket wheel (15ª) is connected, by a chain 21ª, with a smaller sprocket 22ª, which is secured to the vertical shaft 20ª, that is also driven from the motor shaft 131, by means of the worm and worm wheel connections shown in Figs. 8, 9, and 10.

The shear mechanism, which forms a part of this second exemplary embodiment of my invention, comprises a pair of thin sheet steel blades, 48ª—49ª, which may also be of the notched cutting edge or "cat's eye" type. One such blade is detachably secured to the flanged head of a tubular shaft 135, that is rotatably mounted on a fixed stud pin 136, and the other to an arm 137 of an outer concentric sleeve 138, that is revolvably supported on the tubular shaft 135. A pair of bevel gears, 139 and 140, are respectively attached to the concentric shaft and sleeve elements, 135 and 138; and are engaged by an interposed bevel pinion 141 (Fig. 9), which is carried on the end of a horizontal cross shaft 142, and which may be engaged therewith, or disengaged therefrom, by means of an expansion jaw clutch member 143. The ends of the vertical stud pin 136 are rigidly secured in the upper and lower cross bars 145—145, of a rectangular lattice frame, and the horizontal shaft 142 is rotatably mounted on the central cross bar 146 thereof; and this frame is rockingly supported, as a whole, by a pair of offset trunnions 147—147, which are attached to its end plates, and which are pivotally engaged with the vertical legs of a U shaped bracket 148 that is bolted against the side plates of the forehearth 1ª (see Fig. 10).

The shaft 142 is connected to the motor shaft 131, by means of a pair of universal joints and an intermediate link 150—(which permit the frame 145—146 to swing on its trunnion supports in the bracket 148, without interfering with the transmission of motion from the fixed motor elements to the shear actuating gears 141—140—139)—and the lower cross bar of the member 148 is provided with a rearwardly extended shelf 151, which supports the bearings for one end of the timer shaft 130, and which also supports a cylinder 152 that is connected to a source of compressed air (or other fluid) by a pipe 153. This cylinder carries a piston 155, which is connected, by a piston rod 156, to a lever 157, that is pivoted on a bracket 158 extending from the central cross bar 146 of the swinging lattice frame;—the ends of the rod 156 being coupled to the piston and lever elements (155—157) by ball and socket joints so as to permit of the relative swinging movement of the connected parts in both the horizontal and vertical planes. The outer extremity of the lever 157 is engaged by a strong tension spring 160, that tends to move the piston 155 toward the closed end of the cylinder 152; and the other arm of the lever is coupled, in the usual manner, to the expanding jaw clutch 143.

The pivot support for the clutch lever 157 also carries a bell crank lever 161, whose horizontal arm is connected to the adjacent portion of the lever 157 by a one way link bolt 162, and whose vertical arm terminates in an offset dog which is adapted to engage with a notched stop plate 163, that is attached to the rim of the bevel gear 139. A second bell crank lever 165, is pivotally mounted on a bracket extension 166, of the rocking frame member 146, and is provided with an adjustable roller 167, which is positioned in the plane of movement of the stop plate 163, but which is normally held away from contact therewith by the tension spring 168 that is attached to the adjacent extremity of the link 162.

The cylinder 152 is provided with two check valves 170 and 171, which respectively control the inlet port through which motive fluid is admitted from the pressure supply pipe 153, and the exhaust port from which this motive fluid escapes to the atmosphere. The stem of the valve 170 is connected to the lever 165 by a link 172, which is coupled to the connected parts by universal joints, which permit the relative angular movement of the swinging frame members, 145—146—166 etc., with respect to the fixed bracket members 148—151—152 etc., and which also allow the lever 165 to swing freely on its support 166. The stem of the valve 171 is engaged by a cam 173, on the timer shaft 130, and this valve is normally held closed by a compression spring interposed between its head and the adjacent side of the cylinder 152 (see Fig. 9).

The cycle of feeding and severing operations, which are performed by the elements of the last described construction, is essentially the same as that which is followed in the successive cooperative movements of the mechanism shown in Figs. 1 to 7 inclusive; and may be briefly redescribed as follows: When the piston slide valve 124 is moved to the position shown in Fig. 8 (by the action of the timer cam 128), the lower end of the cylinder 111 is open to the atmosphere and the upper end thereof is put into communication with the fluid pressure conduit 122; and the connected piston and bell members 110—B', are moved downward to the lower limit of their stroke—as determined by the engagement of the piston with the lower head 111a of the cylinder—thereby closing, or very greatly restricting, the passage or opening (G') from the forehearth chamber (C) to the segregation chamber (D'). As the piston moves downward it uncovers the port openings 113, and permits the compressed motive fluid in the upper piston chamber to enter the hollow valve plunger 112 and pass downwardly through the tubular shaft 5a and the communicating duct in the bell B' to the chamber D'. The pressure thereby applied to the glass within the bell is controlled by the action of the needle valve 114, which is actuated by the lever-link and timer-cam elements 116—127—129, and which may be so regulated (by the construction and setting of the parts 112, 127 and 129) as to vary, at will, the initiation and termination of this applied pressure, and also vary its magnitude at any intermediate point in this interval of application. The continued rotation of the timer cam shaft 130 (by the motor shaft 131) will next move the piston valve 124 downwardly, thus closing the admission port to the upper end of the cylinder—but not at first opening it to the atmosphere—and establishing communication between the pressure supply conduit 122 and the lower end of the cylinder 111. The superior differential pressure on the lower and larger head of the piston member 110 will lift the connected members 110—5a—B' and thus begin to enlarge the passageway G' that leads to the segregation chamber D'. But at this stage of the movement the air in the upper piston chamber is trapped therein, and the ports 113 are still open; thus permitting the maintenance of any desired pressure (as controlled by the throttle valve 114) on the glass in the chamber D', and thereby preventing any undesired diminution or retardation of outflow from the delivery orifice F', during the first upward movement of the bell B'. As the upper end of the piston 110 passes, and closes, the ports 113 the piston valve 124 is concurrently moved downward by an amount sufficient to open the upper piston chamber to the atmosphere; and the port 117 in the tubular shaft 5a is, at the same time, brought into registry with the annular groove 118 in the bearing member 12a, thus allowing the confined air in the bell chamber to escape—either quickly or slowly as may be desired—through the throttled valve opening 119. The immediate resultant diminution in the pressure within the segregation chamber D' permits the glass in the forehearth to rush through the now relatively large passage (G'), between the top of the flow block 2a and the lower end of the upwardly moving bell, and quickly fill the said chamber to a level substantially equal to that of the surrounding body of molten material, while still maintaining a substantial gravity discharge of glass from the submerged orifice F". When the piston-bell members have reached the upper end of their stroke—which is limited by the engagement of the piston with the upper head of the cylinder—the valve 124 is again lifted, at the proper time, and the above described cycle of operations is repeated.

The time of initiation of both the upward and downward movements of the piston and bell assembly is controlled by the contour and adjustment of the timer cam 128, and by the rotative speed of the cam shaft 130; and the speed of these movements may be controlled, either concurrently or independently, by the pressure in the supply line 122, or by the throttle valves 175 and 176 in the exhaust outlets from the cylinder 111. No provision is shown for varying the range of piston bell movement, but it will be readily understood that this variation may be easily effected by the use of suitable stops; and it will also be apparent that the position of the bell at the lower limit of its movement may be readily changed by moving the cylinder and cross head members (12a—111—111a) up or down on their post supports (65a—65a). The maintenance of a uniform temperature in the mass of glass surrounding the reciprocatory bell member is facilitated by the "stirring" action which results from the up and down movement of the enlarged lower end of the bell; and this action may be supplemented, if desired, by the continued rotation of this member, on its vertical axis, through the motor driven connections 15ᵃ—21ᵃ—22ᵃ—20ᵃ.

When it is desired to sever the constantly flowing stream which issues from the delivery orifice— which is preferably done when the relief of fluid pressure on the glass in the segregation chamber D' has diminished the rate of extrusion and produced a natural "necking" of the outflowing material, but which may be done at any desired time—the valve 171 is opened by the timer cam 173, and the immediate drop in pressure in the cylinder 152, will cause the check valve 170 to seat and cut off further admission of motive fluid from the pipe 153. The piston 155 will then be retracted by the spring 160; and the concurrent movement of the lever 157 will first disengage the dog on the lever 161 from the notched stop plate 163, and then engage the clutch 143 on the revolving shaft 142 with the bevel pinion 141. This engagement will cause the pinion to rotate the two bevel gear and shaft assemblies 139—135 and 140—138, in opposite directions; and will move the attached shear blades 48ᵃ—49ᵃ, from the normal inactive position, shown in Fig. 8, toward and through the following stream of glass; and the latter will be severed when the blades meet and cross each other, at a relatively high velocity, beneath the delivery orifice F. The rotating parts continue their movement, and as they approach the starting point the rounded face of the stop plate 163 engages the roller 167 on the lever 165—which was rocked toward the edge of the gear 139 by the closing of the check valve 170—and acts to return this lever to the full line position of Fig. 9, and thus reopen the valve 170. The exhaust valve 171 has, in the meantime, been allowed to close, by the continued rotation of the timer cam 173; and the reopening of the valve 170 admits motive fluid to the cylinder 152 and forces the piston 155 outwardly, thereby disconnecting the clutch 143, and permitting the stop lever 161 to engage with the notch of the stop plate 163;—the roller 167 being so adjusted on the lever 165 that the rotating parts are frictionally retarded (after the clutch 143 is disconnected) by a sufficient amount to permit of their positive arrest (by the stop elements 161—163) without undue shock or jar.

The severing action of this type of rotating high speed shear mechanism in so rapid that there can be very little downward flow of the glass while the cutting blades are in contact therewith; but in order to provide for a conjoint transverse and axial movement of the blades at the time of severance (see Fig. 7 supra), I cut away one side of the hub of the bevel gear 139 to form a cam 177 (see enlarged view of Fig. 11), mount a cam roller 178, on the adjacent part of the fixed bracket 148, and connect the lower cross bar 145 of the swinging lattice frame, (145—145—146), with the said bracket (148) by means of a tension spring 180, that serves to hold the cam and roller elements 177 and 178 in pressure engagement with each other. The cam 177 is so shaped and positioned that just prior to the engagement of the shear blades with the periphery of the flowing stream the depressed portion of the cam surface begins to move under the roller 178; and the pull of the spring 180 then acts to rock the lattice frame support for the moving parts in a counterclockwise direction, on its trunnion bearings 147—147; and thus communicate the desired downward, or axial movement to the revolving shear blades. The ratio between the two components of shear blade movement (transverse and axial) is, in this case, controlled by the edge contour of the cam 177; and this may be varied within wide limits. The initial or mean position of the plane of severance (i. e., the "shear height" adjustment) may be altered either by shifting the position of the roller 178 on the bracket support 148, or by lifting or lowering this bracket support as a whole;—this last mentioned means of adjustment being easily obtained by slotting the holes for the bolts that clamp and vertical legs of the bracket against the side plates of the forehearth frame (Fig. 10).

There are various minor features of structural detail, which are clearly shown in the drawings, that have not been specifically described because they will be readily understood by those skilled in this art. The preceding disclosure will enable those familiar with the construction and operation of glass feeders to appreciate the characteristic features of my improved mode of procedure, and to devise various other forms of apparatus for practicing this invention as defined in the accompanying claims.

I desire it to be understood that I have devised various shearing structures, and various shearing procedures for severing a continuously flowing stream of molten glass to produce well formed mold charges and in which the shear blades move downwardly with the stream and that such mechanisms and such procedures form the subject matter of and are claimed in copending applications for patents and structurally and functionally distinguish from the features herein claimed.

What I claim as new and desire to secure by Letters Patent is:

1. A shear mechanism for severing mold charges from a suspended mass of molten glass, comprising opposed shear blades, means for moving said blades into cutting engagement one with the other, and means actuated by the movement of one such blade toward cutting position for moving said blades in a transverse direction as they move into cutting engagement.

2. A shear mechanism for severing mold charges from a moving mass of molten glass, comprising opposed shear blades, means for moving said blades into and out of cutting engagement, a mechanism for moving said blades in the direction of travel of such mass during the operation of said means, and means actuated by the movement of one of said blades toward cutting position for controlling the operation of said mechanism.

3. A shear mechanism, comprising a pivotally mounted frame, shear blades carried by said frame, means for moving said blades into cutting engagement, means responsive to the movement of said blades for tilting said frame during the operation of said first mentioned means, means for retracting said blades, and means for holding said frame in tilted position until said blades are fully retracted.

4. A shear mechanism comprising a movable frame, shear blades mounted on said frame, pressure responsive means for moving said blades into cutting engagement one with the other, and pressure responsive means controlled by said first mentioned means for moving said frame during such movement of said blades.

5. A shear mechanism for severing mold charges from a suspended mass of molten glass, comprising a movable frame, opposed shear blades mounted on said frame, and interconnected pressure responsive means for moving said blades into cutting engagement and for simultaneously tilting said frame.

6. A shear mechanism for severing mold charges from a moving mass of molten glass, comprising opposed shear blades, means for moving said blades into cutting engagement one with the other, means for synchronizing the movement of said blades, means actuated by the movement of said blades toward cutting engagement for moving said blades downwardly in the direction of travel of said mass, and means operable when said blades are in lowered position for fully retracting the same.

7. A shear mechanism for severing mold charges from a moving mass of molten glass comprising a pair of opposed shear blades, pressure responsive means for moving said blades into cutting engagement one with the other, means for synchronizing the movement of said blades, and pressure responsive means actuated by the operation of said first mentioned means for simultaneously moving said blades in the direction of movement of said molten glass.

8. A shear mechanism comprising a movable frame, shear blades carried by said frame, pressure responsive means for moving said blades into cutting engagement one with the other, means for retracting said blades, means for synchronizing the movement of said blades, pressure responsive means controlled by the operation of said first mentioned means for tilting said frame, and means for holding said frame in tilted position until said blades are fully retracted.

9. A shear mechanism comprising pivotally mounted frame, shear blades carried by said frame, means for moving said blades into cutting engagement one with the other, a mechanism for tilting said frame, and means operated by said first mentioned means for controlling the operation of said frame tilting mechanism.

10. A shear mechanism comprising a pivotally mounted frame, shear blades carried by said frame, pressure responsive means for moving said blades into cutting engagement one with the other, pressure responsive means for tilting said frame, and means operated by the movement of said first mentioned means for controlling the delivery of pressure to said frame tilting means.

11. A shear mechanism comprising a movable frame, shear blades carried by said frame, a movable cylinder connected to one of said blades, a piston slidably mounted in said cylinder and connected to the other of said blades, a cylinder and piston assembly for moving said frame, means for introducing pressure into the cylinder and piston assembly attached to said blades to move the blades into cutting position, and means controlled by the movement of said blades for introducing pressure into the frame moving cylinder assembly.

12. A shear mechanism comprising a movable frame, a pair of opposed shear blades carried by said frame, a movable cylinder connected to one of said blades, a piston slidably mounted in said cylinder and connected to the other of said blades, a pressure line leading to said cylinder, an intermittently operated valve in said line, a cylinder and piston assembly connected to said frame, a pressure line leading to said last mentioned cylinder, and means actuated by the movement of said blades for controlling the delivery of pressure to said last mentioned cylinder.

13. A shear mechanism comprising a movable frame, a pair of shear blades carried by said frame, a movable cylinder connected to one of said blades, a piston slidably mounted in said cylinder and connected to the other of said blades, means for intermittently delivering pressure to said cylinder to move said blades to cutting position, means for moving said cylinder and piston to their original position to retract said blades, mechanism for tilting said frame, means controlled by the movement of said cylinder for operating said mechanism, and means for holding said frame in tilted position until said blades are fully retracted.

14. A shear mechanism for severing mold charges from a moving mass of molten glass comprising a movable frame, shear blades coaxially mounted on said frame, means for rotating such blades, and means responsive to the rotation of said blades for tilting said frame to move it in the direction of travel of said mass during the rotation of said blades.

15. A shear mechanism for severing mold charges from a moving mass of molten glass comprising a tiltable frame, shear blades coaxially and rotatably mounted on said frame, means for periodically rotating said blades, to move the blades across each other in cutting engagement, and means responsive to the rotation of said blades for tilting said frame to impart a downward movement to the blades as they cross each other in cutting engagement.

16. A shear mechanism for severing mold charges from a moving mass of molten glass comprising coaxially mounted shear blades, means for periodically rotating said blades to move the blades across each other in cutting engagement, and means responsive to the rotation of said blades for moving the blades in the direction of movement of the mass as they cross each other in cutting engagement.

17. A shear mechanism for severing mold charges from a moving mass of molten glass comprising coaxially and rotatably mounted shear blades, means for releasably locking said blades against rotation, means for moving said locking means to release said blades, means for rotating said blades in opposite directions through one revolution while said locking means are released, means responsive to the rotation of said blades for imparting a downward movement to the blades as they cross each other in cutting engagement, and means actuated by the rotation of said blades for resetting said blade locking means.

18. A shear mechanism for severing mold charges from a moving mass of molten glass comprising a tiltable frame, shear blades rotatably mounted on said frame, means for locking said blades against rotation, means for moving said locking means to release said blades, means for rotating said blades to move the blades across each other in cutting engagement, means responsive to the rotation of the blades for tilting said frame to impart a downward movement thereto as they cross each other in cutting position, and means actuated by said blade rotating means for moving said locking means into engagement with said blades.

19. A shear mechanism for severing mold charges from a moving mass of molten glass comprising a tiltable frame, shear blades rotatably mounted in said frame, mechanism for rotating said blades to move the blades across each other in cutting position, a rotating element carried by said frame, means for periodically connecting sad rotating element with said blade rotating mechanism, and means responsive to the operation of said blade rotating mechanism for tilting said frame to impart a downward movement to the blades as they cross each other in cutting engagement.

20. A shear mechanism for severing mold charges from a moving mass of molten glass comprising a pair of shear blades, means for moving said blades into and out of cutting engagement, a mechanism for moving said blades in the direction of travel of such mass during the operation of such means, and means actuated by the movement of the blades toward cutting engagement for controlling the operation of said mechanism.

21. A shear mechanism for severing mold charges from a suspended mass of molten glass comprising a pair of shear blades, means for moving said shear blades into cutting engagement one with the other, and means actuated by the movement of said blades toward cutting position for moving said blades in a transverse direction as they move into cutting engagement.

22. A shear mechanism for severing mold charges from a suspended mass of molten glass comprising a movable frame, shear blades coaxially and rotatably mounted on said frame, a mechanism for turning said blades in opposite directions to move the blades across each other in cutting engagement, a rotating element carried by said frame, means for locking said mechanism in a fixed position to prevent turning of said blades, means for moving said locking means to release said mechanism, means operable on the movement of said locking means for connecting said mechanism with said rotating element, means responsive to the operation of said mechanism for tilting said frame to impart a downward movement to the blades as they cross each other in cutting engagement, and means responsive to the operation of said mechanism for disconnecting the mechanism from said rotating element and for resetting said locking means to bring the blades to rest at the end of one complete revolution.

23. A shear mechanism for severing mold charges from a moving stream of molten glass comprising opposed shear blades, fluid actuated means for moving said blades into cutting engagement one with the other and other fluid actuated means controlled by the position of the blades for moving said blades in the direction of stream travel during the operation of said first mentioned means.

24. A shear mechanism for severing mold charges from a moving mass of molten glass comprising opposed shear blades, means for moving said blades into cutting engagement one with the other, means actuated by the movement of said blades toward cutting engagement for moving said blades downwardly in the direction of travel of said mass, means for retracting the blades out of the line of travel of the mass while in their lowered position, and means for raising said blades while so retracted.

25. A shear mechanism comprising a movable frame, shear blades carried by said frame, fluid actuated means for moving said blades into cutting engagement one with the other, means for retracting said blades, fluid actuated means controlled by the operation of said first mentioned means for tilting said frame, and means for holding said frame in tilted position until said blades are fully retracted.

26. A method of forming separate charges of molten glass from a continuous downwardly flowing stream of molten glass, which consists in effecting a severance of said stream by periodically subjecting such stream to the cutting action of opposed shear blades, while such blades are moving downwardly in the direction of stream flow, retracting such blades while holding the blades in their lowered position, and then returning said blades to their initial position while maintaining them in a retracted position.

FRANK L. O. WADSWORTH.